US008599758B1

(12) United States Patent
Ogale et al.

(10) Patent No.: US 8,599,758 B1
(45) Date of Patent: Dec. 3, 2013

(54) INDOOR LOCALIZATION OF MOBILE DEVICES

(75) Inventors: Abhijit Ogale, Mountain View, CA (US); Ehud Rivlin, Haifa (IL)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/090,710

(22) Filed: Apr. 20, 2011

(51) Int. Cl.
*H04W 4/00* (2009.01)

(52) U.S. Cl.
USPC .......................................................... 370/328

(58) Field of Classification Search
USPC ............... 370/310, 328, 338; 455/403, 422.1, 455/456.1, 456.2
See application file for complete search history.

(56) References Cited

U.S. PATENT DOCUMENTS

| | | | |
|---|---|---|---|
| 6,987,982 B2 * | 1/2006 | Willenegger et al. | 455/515 |
| 7,116,988 B2 * | 10/2006 | Dietrich et al. | 455/456.1 |
| 7,286,835 B1 * | 10/2007 | Dietrich et al. | 455/456.1 |
| 7,983,667 B2 * | 7/2011 | Hart et al. | 455/423 |
| 8,070,062 B2 * | 12/2011 | Goel et al. | 235/383 |
| 8,098,155 B2 * | 1/2012 | Gloo et al. | 340/539.21 |
| 8,400,359 B2 * | 3/2013 | Liu et al. | 342/463 |
| 2006/0018336 A1 * | 1/2006 | Sutivong et al. | 370/437 |
| 2008/0113672 A1 * | 5/2008 | Karr et al. | 455/456.1 |
| 2008/0161011 A1 | 7/2008 | Babin et al. | |
| 2008/0285530 A1 * | 11/2008 | Dietrich et al. | 370/338 |
| 2009/0322603 A1 | 12/2009 | Liao | |
| 2010/0008337 A1 | 1/2010 | Bajko | |
| 2010/0157848 A1 | 6/2010 | Das et al. | |
| 2010/0265093 A1 | 10/2010 | Cho et al. | |
| 2010/0309059 A1 | 12/2010 | Wu et al. | |
| 2010/0311436 A1 | 12/2010 | Bevan et al. | |
| 2011/0090124 A1 * | 4/2011 | Liu et al. | 342/463 |
| 2011/0250906 A1 * | 10/2011 | Siomina et al. | 455/456.2 |
| 2011/0274094 A1 * | 11/2011 | Jovicic et al. | 370/338 |
| 2012/0130632 A1 | 5/2012 | Bandyopadhyay et al. | |
| 2012/0149415 A1 | 6/2012 | Valaee et al. | |
| 2012/0178472 A1 | 7/2012 | Bevan et al. | |
| 2012/0190380 A1 * | 7/2012 | Dupray et al. | 455/456.1 |
| 2012/0322501 A1 | 12/2012 | Abouzid et al. | |
| 2013/0003572 A1 | 1/2013 | Kim et al. | |

FOREIGN PATENT DOCUMENTS

WO    2010004081 A1    1/2010

* cited by examiner

*Primary Examiner* — Chi Pham
*Assistant Examiner* — Robert Lopata
(74) *Attorney, Agent, or Firm* — Lerner, David, Littenberg, Krumholz & Mentlik, LLP

(57) ABSTRACT

Aspects of this disclosure provide systems and methods for generating models of a wireless network environment in an indoor space which may be used to predict an indoor location. The disclosure relates to collecting wireless network access point identifier information and power level observed at various locations are collected to generate various signal maps. The signal maps may be used to generate models of the indoor space. In one example, a voting model may use a probability distribution of a plurality of signal maps in order to identify a location with a highest probability of overlap with current signals received at a client device. Once a location has been identified, it may be used to assist with any number of navigational functions, such as providing turn by turn directions to another indoor location, for example, a conference room or exit, or simply providing information about the current location.

18 Claims, 9 Drawing Sheets

Cumulative

INDOOR LOCALIZATION OF MOBILE DEVICES

CROSS-REFERENCE TO RELATED APPLICATIONS

This application is related to copending U.S. patent application Ser. No. 13/090,785 entitled "INDOOR LOCALIZATION OF MOBILE DEVICES," filed concurrently herewith on Apr. 20, 2011, the entire disclosure of which is hereby incorporated by reference herein.

BACKGROUND

Various navigation systems provide users with turn-by-turn directions. These systems may include handheld GPS devices, mobile phones, or vehicle-mounted devices. Users input one or more locations and receive a route and turn-by-turn directions based on the inputted locations. The user may follow the turn-by-turn directions to reach the one or more locations.

These navigation systems rely on the ability to receive information from a plurality of GPS satellites. This allows for identification of a current location of a device for providing navigational assistance. However, while indoors, a mobile device may require accurate localization to enable features such as advanced indoor navigation, for example, to conference rooms in a building or stores within a mall. In an indoor environment, accurate localization is difficult due to the lack of adequate signals from the GPS satellites.

Many modern commercial facilities include numerous wireless network access points which may be used in order to provide indoor localization.

SUMMARY

Aspects of this disclosure relate generally to generating models of a wireless network environment in an indoor space which may be used to predict indoor location. More specifically, aspects relate to collecting wireless network access point identifiers and power level observed at various locations to generate various signal maps. The collected data need only include enough information to generate the signal maps (the identifiers, associated signal strengths, and location data) and need not contain additional information.

These signal maps may be used to generate models of the indoor space. In one example, a voting model may use a probability distribution of a plurality of signal maps in order to identify a location with a highest probability of overlap with current signals received at a client device. In another example, a rectangular model may use the intersection of rectangles representing different signals in order to identify a location. The different methods may be used based upon the capabilities of the mobile device, the available network bandwidth, or other such considerations. Once a current location of a client device has been identified, it may be used to assist with any number of navigational functions, such as providing turn by turn directions to another indoor location, for example, a conference room or exit, or simply providing information about the current location.

One aspect of the disclosure provides a method. The method includes receiving one or more wireless network access point identifiers and signal strengths associated with the one or more wireless network access point identifiers for an indoor geographic area; quantizing, by a processor, the received signal strengths into a plurality of quantized received signal strengths for each associated wireless network access point identifiers; generating a voting map for each MAC address and quantized received signal strength; and transmitting voting map to a client device.

In one example, the method also includes receiving a request, from the client device, for the voting map.

Another aspect of the disclosure provides a method. The method includes receiving a set of voting maps. Each voting map of the set of voting maps including a wireless network access point identifier and signal strength data. The method also includes scanning for wireless network signals to identify scan results including one or more wireless network access point identifiers and associated signal strengths; associating the scan results with a timestamp; quantizing, by a processor, the signal strengths of the identified one or more wireless network access point identifiers to obtain quantized identified signal strengths; selecting one or more voting maps of the set of received voting maps based upon the identified one or more wireless network access point identifiers; combining the selected one or more voting maps into a cumulative voting map; normalizing the cumulative voting map to obtain a probability distribution over location; propagating the probability distribution from a previous timestamp using a motion model; and identifying, by the processor, the current location of a device based on the propagated distribution.

In one example, identifying the current location of the device is based on a previous location of the device and the motion model is an isotropic diffusion model. In another example, identifying the current location of the device is based on a previous location of the device and the motion model is an anisotropic diffusion model based on directional motion information. In yet another example, the method also includes receiving input from a directional device, wherein the anisotropic diffusion model is based on the received input. In still another example, the geographic area is a floor of a building. In a further example, the motion model is based on sensor input received from an accelerometer. In another example, the motion model is based on sensor input received from a gyroscope. In another example, the method also includes combining the propagated distribution with a current probability distribution to obtain a combined probability distribution, and wherein the current location of the device is identified based on the combined probability distribution. In another example, the wireless network access point identifiers is a MAC address.

Another aspect of the disclosure provides a device for determining a current location of a device. The device includes memory and a processor. The processor collects one or more wireless network access point identifiers and signal strengths associated with the one or more wireless network access point identifiers for an indoor geographic area; quantizes the collected signal strengths into a plurality of quantized collected signal strengths for each associated wireless network access point identifiers; generates a voting map for each wireless network access point identifier and quantized collected signal strength; stores each voting map in the memory; scans for wireless network signals to identify scan results including one or more wireless network access point identifiers and associated signal strengths; associates the scan results with a timestamp; quantizes the signal strengths of the identified one or more wireless network access point identifiers to obtain quantized identified signal strengths; selects one or more voting maps based upon the identified one or more wireless network access point identifiers; combines the selected one or more voting maps into a cumulative voting map; normalizes the cumulative voting map to obtain a probability distribution over location; propagates the probability distribution from a previous timestamp using a motion model; and identifies the current location of the device based on the propagated distribution.

Yet another aspect of the disclosure provides a device for determining a current location of a device. The device includes memory storing a set of voting maps, each voting map of the set of voting maps including a wireless network access point identifier and signal strength data. The device also includes a processor that scans for wireless network signals to identify scan results including one or more wireless network access point identifiers and associated signal strengths; associates the scan results with a timestamp; quantizes the signal strengths of the identified one or more wireless network access point identifiers to obtain quantized identified signal strengths; selects one or more voting maps based upon the identified one or more wireless network access point identifiers; combines the selected one or more voting maps into a cumulative voting map; normalizes the cumulative voting map to obtain a probability distribution over location; propagates the probability distribution from a previous timestamp using a motion model; and identifies the current location of the device based on the propagated distribution.

In one example, the processor identifies the current location of the device based on a previous location of the device and the motion model is an isotropic diffusion model. In another example, the processor identifies the current location of the device based on a previous location of the device and the motion model is an anisotropic diffusion model based on directional motion information. In yet another example, the processor receiving input from a directional device, wherein the anisotropic diffusion model is based on the received input. In still another example, the geographic area is a floor of a building. In a further example, the motion model is based on sensor input received from an accelerometer. In another example, the processor combines the propagated distribution with a current probability distribution to obtain a combined probability distribution, and the processor identifies the current location of the device based on the combined probability distribution. In yet another example, the wireless network access point identifiers is a MAC address.

DETAILED DESCRIPTION

In one aspect, wireless network access point identifiers and signal strengths may be collected for an indoor geographic area. For example, this geographic area may be a floor of a building. The signal strengths may be quantized into a plurality of bins or quantized signal strengths for each wireless network access point identifiers. For each collected wireless network access point identifier and each of the quantized signal strengths, a voting map is generated. The voting maps may be normalized to obtain a probability distribution for the indoor geographic area. These voting maps and probability distribution may be stored, for example, at a client device for later use. Alternatively, the voting maps may be stored on a server and transmitted over a network to a client device as needed.

The client device may then scan for wireless network signals to identify one or more wireless network access point identifiers and associated signal strengths. A current location of the client device is then identified based on the probability distribution and the identified one or more wireless network access point identifiers and associated signal strengths.

In some examples, in order to increase the accuracy of the identified location and to eliminate any locations associated with the same wireless network access point identifier and power combinations, the probability of being located at a previous location may be used to identify a current location. For example, isotropic or anisotropic diffusion models may be used based on the distance a user may travel in some short period of time.

Figure 1:
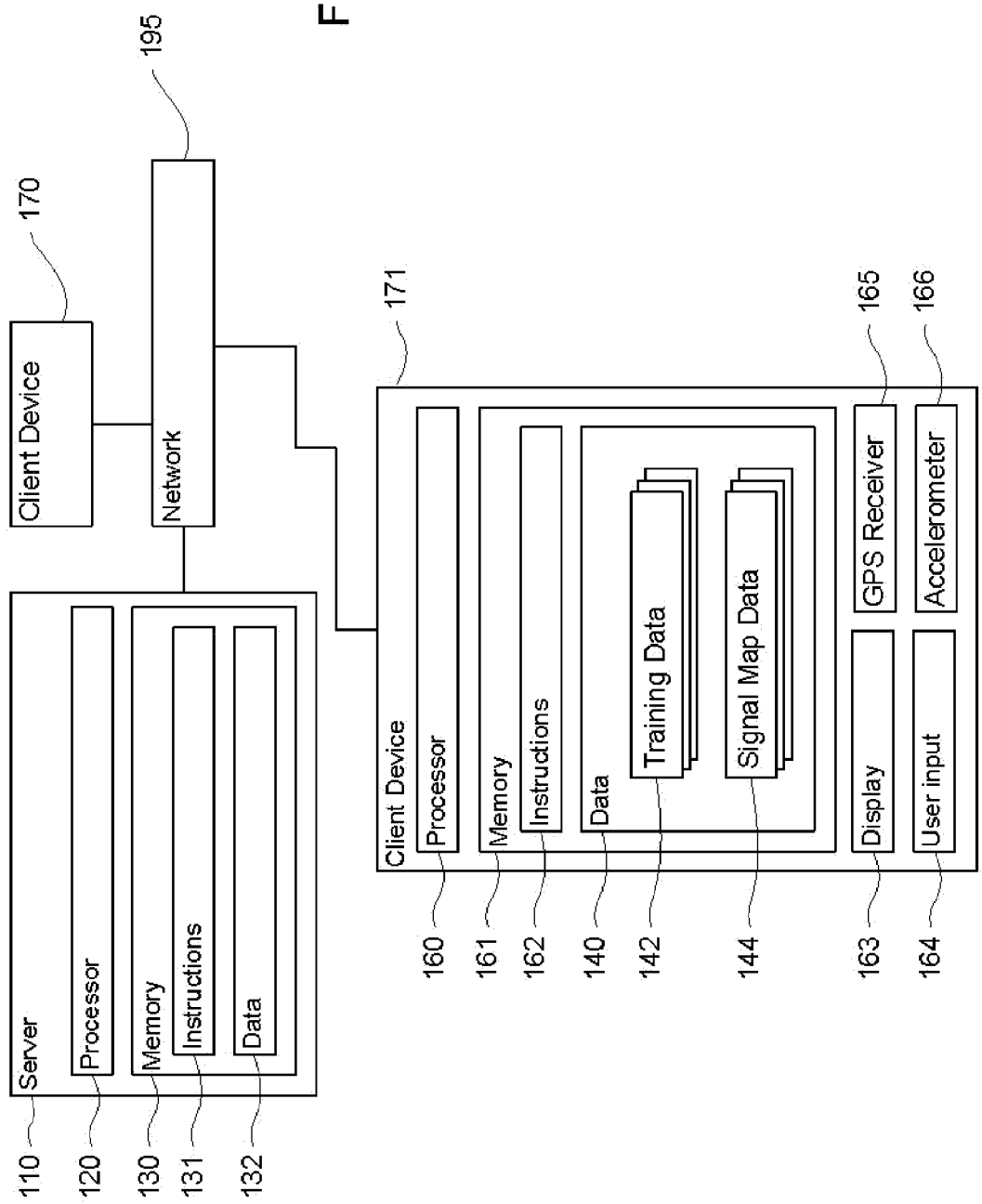
FIG. 1 is a functional diagram of a system in accordance with an exemplary embodiment.
Figure 2:
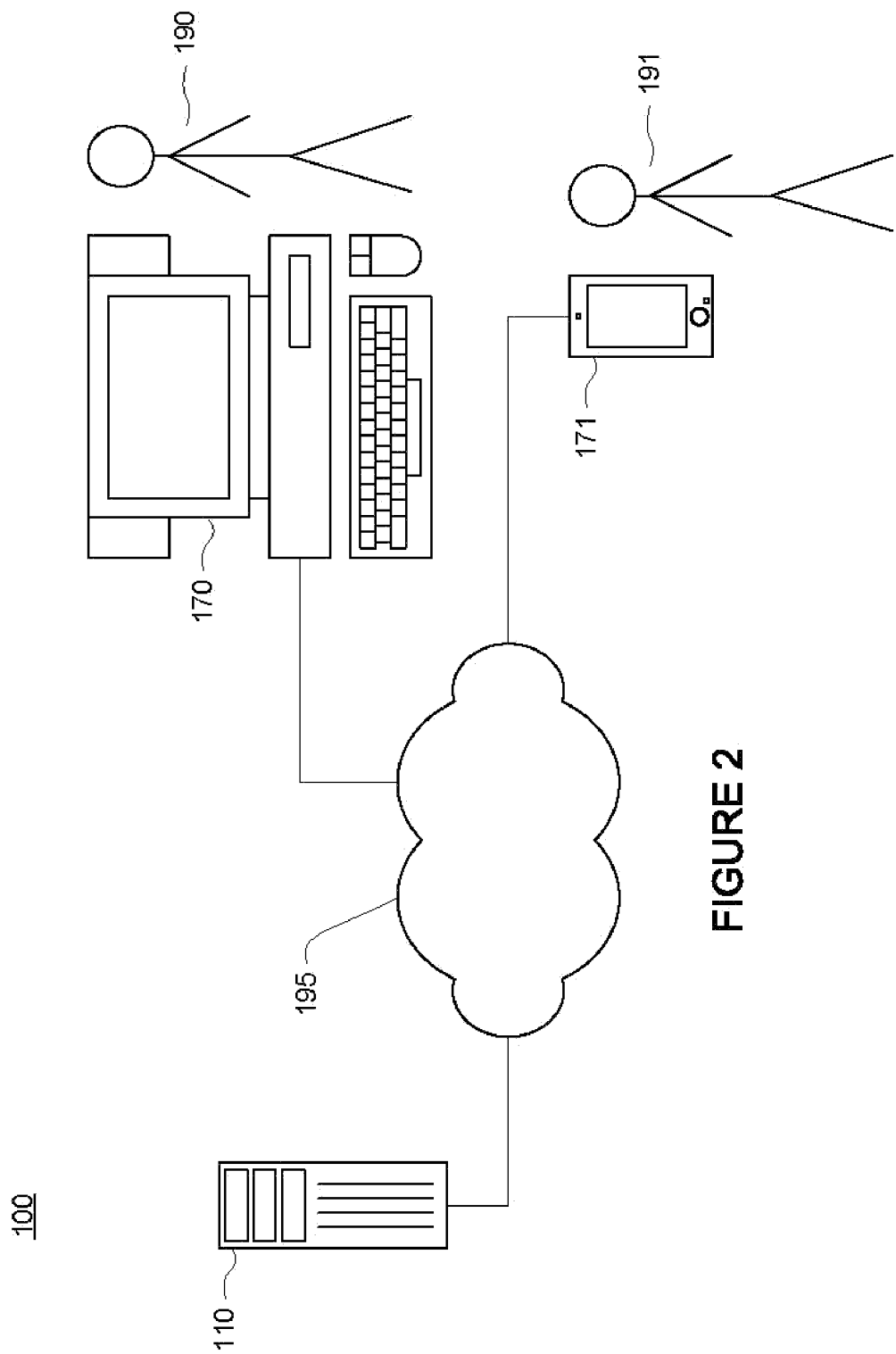
FIG. 2 is a pictorial diagram of a system in accordance with an exemplary embodiment.

As shown in FIGS. 1-2, a system 100 for use with an exemplary embodiment may include a computer 110 containing a processor 120, memory 130 and other components typically present in general purpose computers.

Memory 130 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or Advanced Micro Devices. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display of client device 170. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor 160, memory 161, instructions 162, and data 140. Each client computer 170-71 may be a personal computer, intended for use by a person 190-91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input 164 (for example, a mouse, a keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, or a cellular phone capable of obtaining information via the Internet. The user may input information using a small keyboard, a keypad or a touch screen.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a server and others on a client, various aspects of the system and method may be implemented by a single computer having a single processor.

As shown in FIG. 1, the client devices may also include geographic position component 165, to determine the geographic location and orientation of the device. For example, client device 170 may include a GPS receiver to determine the device's latitude, longitude and altitude position. Thus, as the client device changes location, for example by being physically moved, the GPS receiver may determine a new current location. The component 165 may also comprise software for determining the position of the device based on other signals received at the client device 170, such as signals received at a cell phone's antennas from one or more cell phone towers if the client device is a cell phone.

Client device 171 may also include an accelerometer 166, gyroscope, and/or compass to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

The client device may store training data 142 collected by the client device. The training data may include wireless network access point identifiers, such as MAC address information, SSIDs, or other unique identifiers. These access point identifiers may be used to identify access points for intranets, virtual private networks, wide area networks, local networks, private networks using communication protocols proprietary to one or more companies, Ethernet, WiFi and HTTP, and various combinations of the foregoing.

In one example, MAC addresses of wireless network access points as well as signal strengths may be identified by scanning for wireless network information. For example, wireless network scans may search for beacon messages which contain MAC addresses. In one example, the "beacon" messages are IEEE 802.11 management frames transmitted by access points to announce themselves to potential wireless network users. These frames may contain MAC address information as well as other information used to assist devices in connecting to the wireless network. However, it will be understood that the training data may be limited to the information discussed above, for example MAC addresses or other identifiers and signal strengths, and need not contain additional information. For example, information contained in the network traffic or payload data, such as personal information, need not be collected, and in fact, may actually be removed in order to protect the privacy of the wireless network's users. In another example, network administrators may select to participate in the signal mapping by requesting that this data be collected as described herein. As will be described in more detail below, this training data may then be used to generate one or more models of the indoor space.

Server 110 or client device may store signal map data 144. For example, the map data may be stored locally at the client device or stored at server 110 and transmitted to the client device over network 195 as needed. In one example, the map data may include a plurality of voting or rectangular maps associated with a particular indoor space. For example, the indoor space may include a single floor of a building. Each voting map V or rectangular map R may be associated with a particular MAC address w and a quantized power q for a plurality of locations such that $V=V(w,q)$ or $R=R(w,q)$.

Locations may be expressed and processed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. The systems and methods herein may further translate locations from one reference system to another. For example, the client 171 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

In addition to the operations described above and illustrated in the figures, various operations will now be described. It should also be understood that the following operations do not have to be performed in the precise order described below. Rather, various steps can be handled in a different order or simultaneously.

Training

In order to generate the signal maps discussed above, wireless network information for a particular indoor space is collected and analyzed. This may be described as a "training process." For example, the indoor space may be a single floor of a building. wireless network enabled devices, such as mobile phone, may be moved, for example, walked, around the space. Observed wireless network access points and their signal strengths may be collected at each location, for example around a pre-defined route. In one example, a user walking the device during the training process may identify on a map, for example, by selecting a location to associate with the collected signals, either during the training process or afterwards.

The "training data" collected during the training process may be a plurality of records, each associated with a timestamp. For example, a particular record may include a coordinate set, x,y, which may include latitude and longitude coordinates or other coordinates. The record may also include optional metadata, about the location, for example, a room name or other information such as the direction a phone was pointing as that may affect the power of a signal. As noted above, a collection of all of the wireless network MAC addresses, w, and their associated power, p, may also be collected. Thus, a single record at time t may be: [x(t), y(t), meta(t), wireless network(t)], where wireless network(t)={(w1,p1), (w2,p2), . . . , (wn,pn)}.

It will be understood that additional types of location information may also be collected. For example, although only two coordinates are used in this example, a third coordinate may be used, for example, to delineate between different floors in a building. Upon request, a user may identify which floor of a building the user is on while generating the training data. In another example, the last known GPS location before the user entered a building and lost GPS signal may be recorded.

Voting Model

Figure 3:
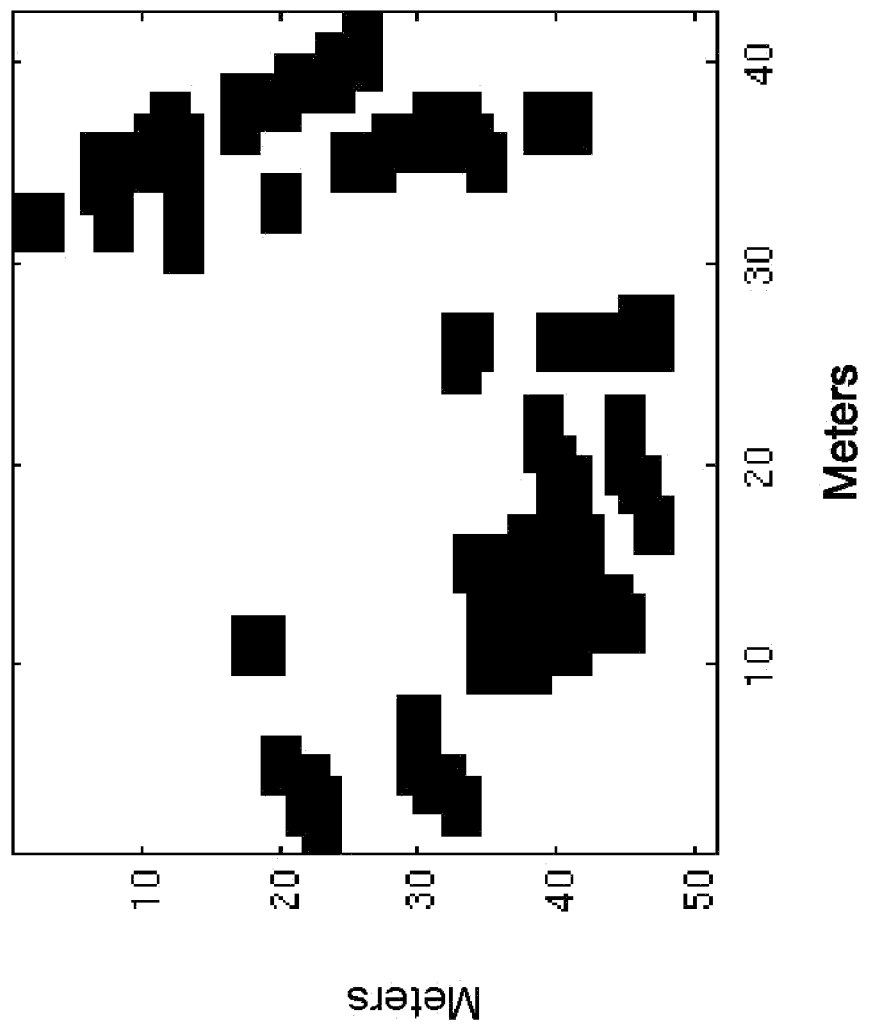
FIG. 3 is an exemplary voting map in accordance with an exemplary embodiment.

This training data may then be used to generate one or more models of the indoor space. In one example, a voting model may be generated. In this model, the wireless network power of each particular signal may be quantized into bins {q1, q2, . . . , qn}. Thus, q may actually represent a range of possible power measurements. The indoor locations may be quantized to a grid, for example, a grid with cells of size N×N meters (e.g. N=1 meter) where the coordinates in the space are delineated as (x,y). For each wireless network access point identifier w and quantized power (or bin) q on a given floor, a voting map may be generated. For each observed wireless network MAC address w and quantized power q, a vote map V(w,q,x,y) may be stored. In other words, if a wireless network access point identifier w with quantized power q has at least F votes (or was observed during the training process at least F times), at grid location x,y, then V(w,q,x,y)=1, otherwise V(w,q,x,y)=0. Generally, F will be equal to 1, but higher levels of F may be used to reduce outliers. For example, FIG. 3 depicts an exemplary voting map. In the map, each section of the location grid is colored (e.g. black) based on whether or not a particular wireless network access point identifier was identified at a particular power level at each of the various grid cells of the map.

As noted above, the voting maps may be stored locally at the client device, or transmitted to the client device as needed. In another example, the user may scan a barcode while entering a particular building to load the building's voting maps.

The voting maps may be used to identify a current location of a client device. For example, a client device may scan for wireless network signals (MAC addresses and power) while located in an indoor space. The scan may result in a series of observed wireless network access point identifiers and power observations: wireless network(t)={{w1,p1},{w2,p2}, . . . }. The powers may be quantized and used to lookup voting maps for each observed MAC address and power combination.

Because multiple wireless network access point identifiers may be observed, a plurality of voting maps may be used in conjunction to identify a location. For example, all of the voting maps for the identified MAC addresses may be added together to obtain Vtotal(x,y)=V(w1,q1,x,y)+V(w2,q2,x,y)+ . . . +V(wn,qn,x,y). This function may be normalized to obtain a probability distribution over the location grid, Plocal (x,y,t)=Vtotal(x,y)/Sum(Vtotal). A location may then be identified by identifying the highest probability in this distribution.

In order to increase the accuracy of the identified location and to eliminate any locations associated with the same wireless network access point identifiers and power combinations, the probability distribution P(x,y,t−1) from the previous time t−1 may be combined with the currently estimated probability distribution Plocal(x,y,t). For example, a motion model may be used to obtain Pprop(x,y,t−1) by propagating P(x,y,t−1), and thus, the combined current probability may be computed as P(x,y,t)=Plocal(x,y,t)*Pprop(x,y,t−1). A location may be identified by identifying the highest probability in P(x,y,t).

In one example of a motion model, an isotropic diffusion model may be used where the sigma (or the distance a user may travel in some short period of time) is limited to some distance per time. For example, if the sigma is 1 meter per second, the location of the client device may be limited to a 1 meter distance from a prior location identified at the prior timestamp. This may increase the accuracy and reduce the amount of computations needed to identify a new location from a prior identified location based on a given distance and time.

In another example, an anisotropic diffusion model with a directional pedometer may also be used, where the direction of the client device's movement may be determined by a motion or direction sensing device such as pedometer, accelerometer, gyroscope, compass, camera, or any combination of these. This again may increase the accuracy and reduce the amount of computations needed to identify a new location from a prior identified location based on a given distance, time, and direction of movement.

Figure 4:
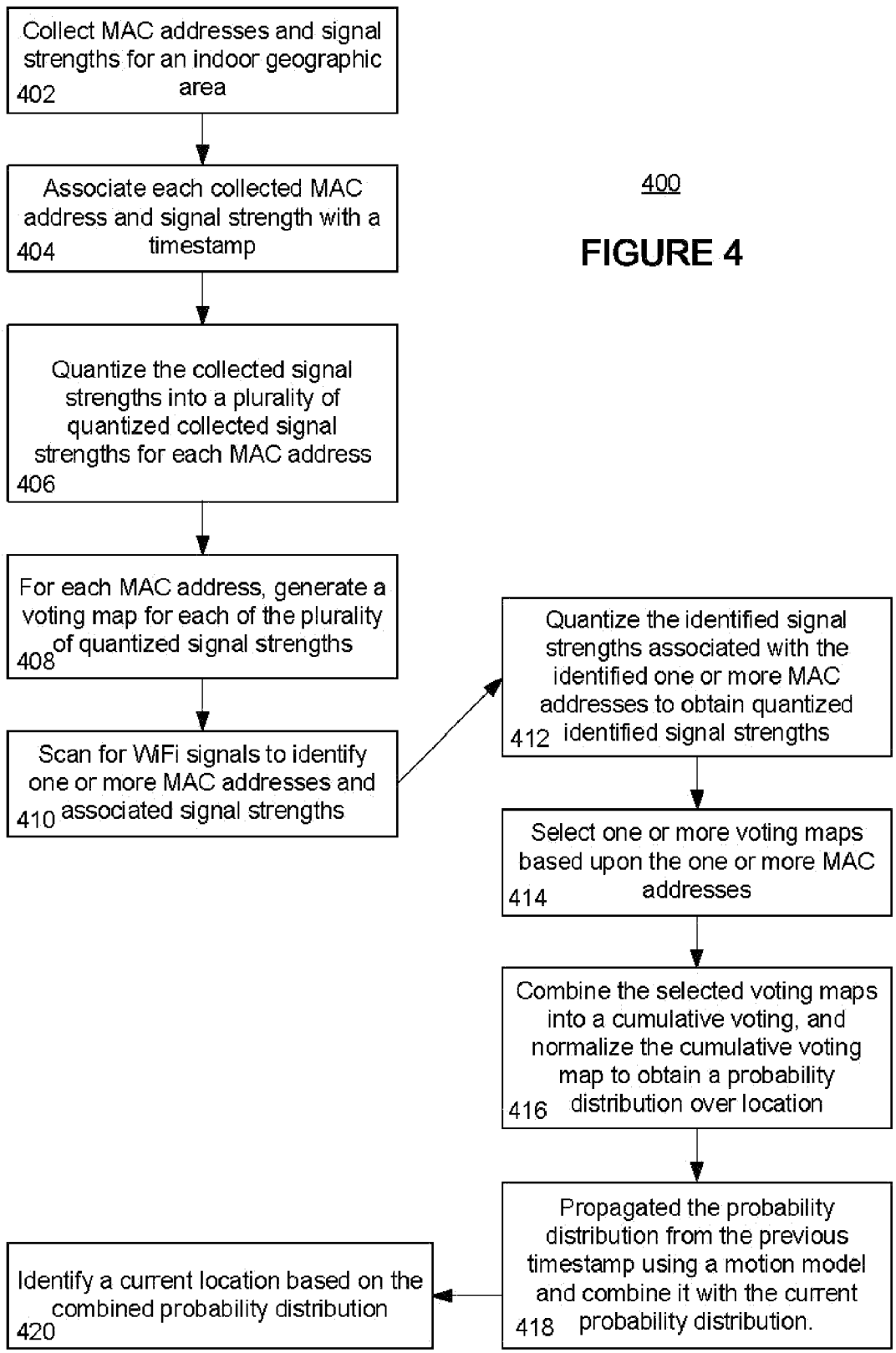
FIG. 4 is a flow diagram in accordance with an exemplary embodiment.

As shown in exemplary flow diagram 400 of FIG. 4, wireless network access point identifiers in this example, MAC addresses, and signal strengths are collected for an indoor geographic area at block 402. For example, this geographic area may be a floor of a building. At block 404, The collected wireless network access point identifiers, here MAC addresses, and associated signal strengths may be associated with timestamps indicative of the order in which the data was collected. The collected signal strengths are quantized into a plurality of bins or quantized signal strengths for each collected wireless network access point identifiers, here MAC address, at block 406. For each collected wireless network access point identifiers, here MAC address, a voting map is generated for each of the quantized signal strengths at block 408. These voting maps may be stored, for example, at a client device or at a server for later use.

The client device may then scan for wireless network signals to identify one or more wireless network access point identifiers, here MAC addresses, and associated signal strengths at block 410. The identified signal strengths associated with the identified one or more wireless network access point identifiers, here MAC addresses, may be quantized at block 412 and used to select appropriate voting maps at block 414. At block 416, the selected voting maps are combined into a cumulative voting map, which is then normalized to obtain a current probability distribution over location. To increase accuracy, the probability distribution from a previous timestamp may be propagated using a motion model, and then combined with the probability distribution from the current timestamp. The combined distribution may then be used to estimate the current location at block 418. A current location of the client device is then identified based on the probability distribution at block 420.

Figure 5A:
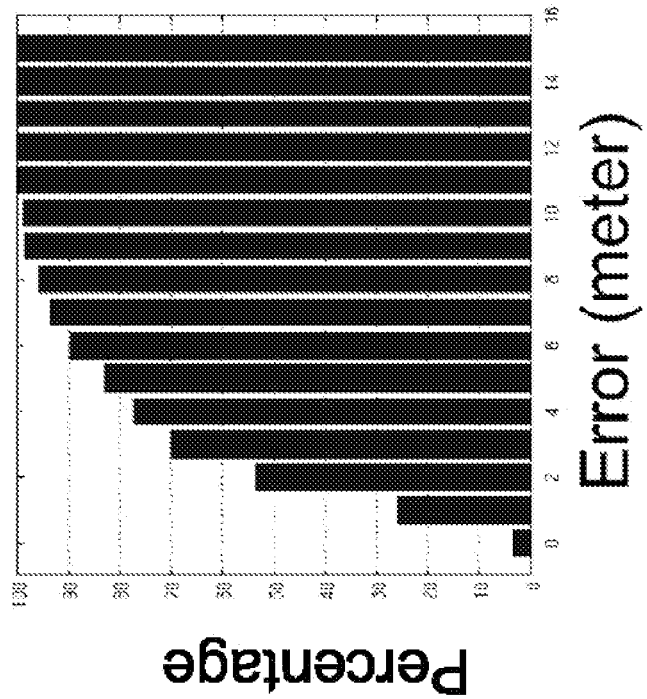
FIGS. 5A and 5B are error graphs in accordance with an exemplary embodiment.
Figure 5B:
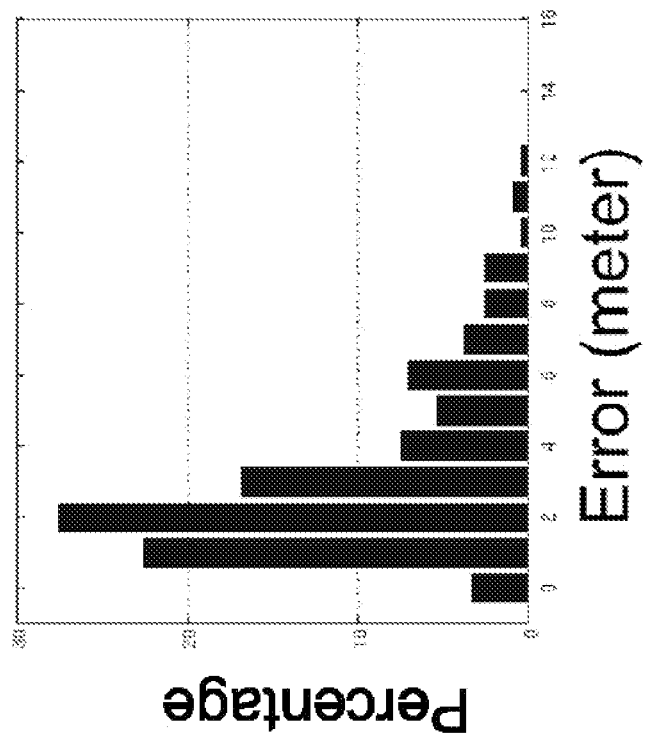

FIGS. 5A and 5B are exemplary error graphs generated based on using the voting model to identify a current location of a mobile device using the isotropic model described above. FIG. 5A depicts the amount of error (in meters) identified at a plurality of locations, while FIG. 5B is a depiction of the cumulative error. As can be seen from the figures, the graphs demonstrate that 53% of the time, the voting model was accurate to less than 2 meters, 70% to less than 3 meters, and 90% to less than 6 meters.

Rectangular Model

While the voting model is relatively accurate, the size of the voting maps (approximately 200 Kb per floor) may consume considerable memory on a mobile device. In addition, the voting model runs in O(MG) time, where M=visible wireless network access point identifiers and G=the number of local grid cells. Thus, as the number of grid cells of the maps and the number of observed wireless network access point identifiers increases, the time and computational resources required may increase. An alternative model, the rectangular model, may also be used. It uses fewer resources, but may also result in a decrease the level of accuracy. Thus, this model may be more effective on platforms with limited resources or bandwidth.

Figure 6:
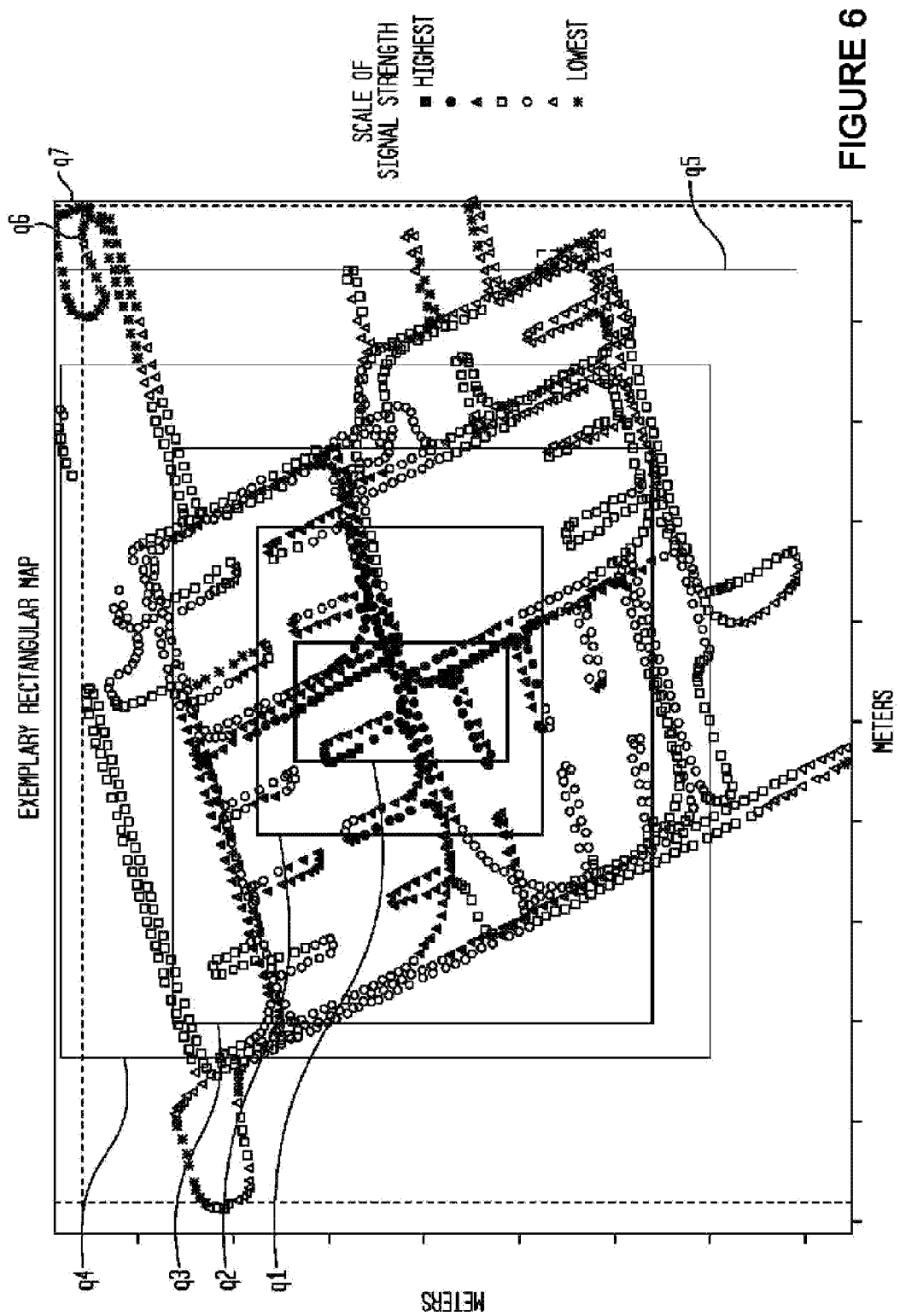
FIG. 6 is an rectangular map in accordance with an exemplary embodiment.

Each voting map, V(w,q,x,y) may be represented as a series of rectangles R(w,q) which bound all locations which have at least F votes. Again, F may equal 1 or more. FIG. 6 depicts a rectangular map for a single MAC (w) and a changing quantized power q (q1-q7). The darker dots within and around q1 at A represent the strongest signals which decrease, from B to G, towards the outer edges of q6 and q7. The map may be divided into rectangles based on the average observed quantized power q for each rectangle. Each of these rectangular maps is much smaller than the voting maps described above (approximately 2 Kb per floor), and the rectangular model runs in O(M) time, where M=visible MAC addresses thus reducing the amount of storage and computation time and resources required.

To calculate the rectangles, outlier rejection strategies may be used to simplify the rectangles and improve the predictive value. In addition, multiple rectangles may be used for each w,q combination rather than a single rectangle for each w,q. However, this may result in an increased resource (computational and memory) cost.

Similar to the voting maps, the rectangular maps may be used to identify a current location of a client device. For example, a client device may observe wireless network(t)={(w1,p1), (w2,p2), ..., (wn,pn)}. The powers may be quantized and used to identify an intersecting rectangle which defines the intersection of each of the rectangles of each of the observed wireless network access point identifiers. For example, Rlocal(t) (a rectangle) may be determined by identifying the intersections of R(w1,q1), R(w2,q2), ..., R(wn, qn).

Again, the voting maps may be stored locally at the client device, or transmitted to the client device as needed.

In another example, the user may scan a barcode while entering a particular building to load the building's voting maps.

Figure 7:
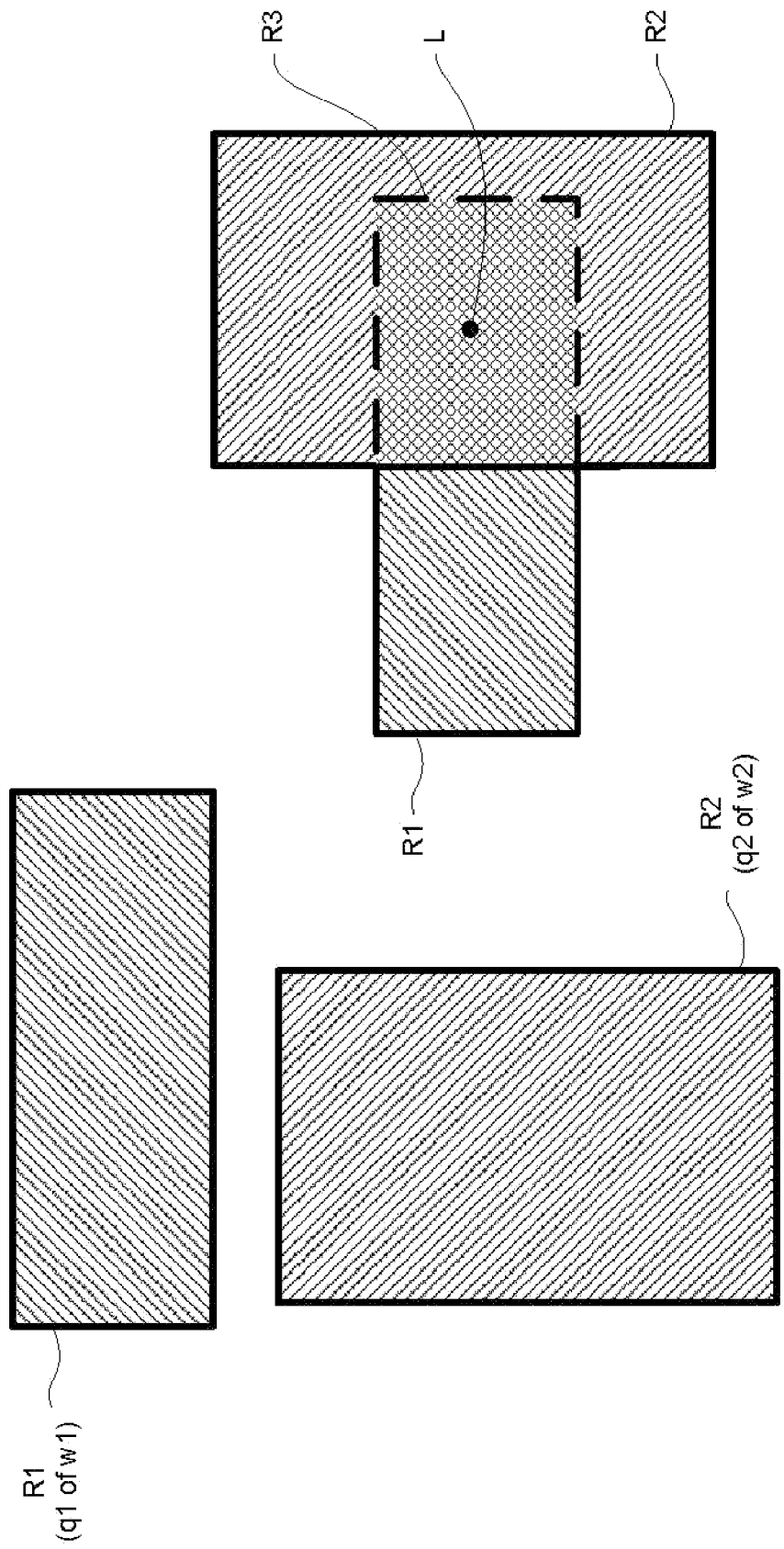
FIGS. 7A and 7B are rectangles in accordance with an exemplary embodiment.

As shown in FIG. 7A, if wireless network(t)={(w1,p1), (w2,p2)}, in one example, q1 of w1 may be within rectangle R1, and q2 of w2 may be within rectangle R2. More particularly, the power p1 is within rectangle R1 of quantized power q1 of wireless network access point identifier w1. Similarly, the power p2 is within rectangle R2 of quantized power q2 of wireless network access point identifier w2. The rectangular intersection of R1 and R2 may be determined, for example, by overlaying rectangles R1 and R2 as shown in FIG. 7B to obtain R3. Next, the current location may be estimated based on the center of Rlocal(t), in the example of FIG. 7B, L, or by other more sophisticated methods, such as the weighted centroid, may be used. Again, this rectangle intersection is far quicker than vote aggregation.

Figure 8:
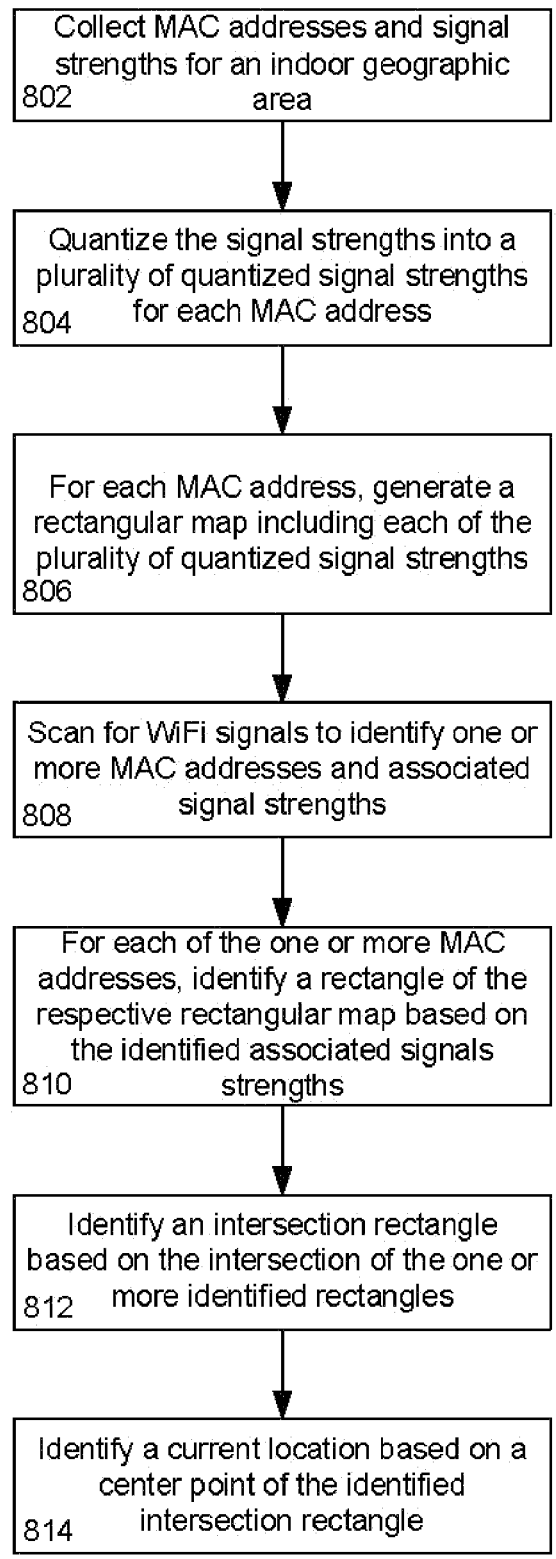
FIG. 8 is a flow diagram in accordance with an exemplary embodiment.

As shown in exemplary flow diagram 800 of FIG. 8, wireless network access point identifiers, in this example MAC address, and signal strengths are collected for an indoor geographic area at block 802. For example, this geographic area may be a floor of a building. The signal strengths are quantized into a plurality of bins or quantized signal strengths for each wireless network access point identifiers, here MAC address, at block 804. For each wireless network access point identifiers, here MAC address, a rectangular map is generated including each of the quantized signal strengths at block 806. The rectangular maps may be stored, for example, at a client device for later use.

The client device may then scan for wireless network signals to identify one or more wireless network access point identifiers, here MAC addresses, and associated signal strengths at block 808. For each particular wireless network access point identifiers, here MAC address, of the one or more wireless network access point identifiers, here MAC addresses, a rectangle is identified based on the rectangular map for the particular wireless network access point identifiers, here MAC address, and the identified associated signal strength at block 810. An intersection rectangle is identified based on the intersection of the one or more identified rectangles at block 812. Finally, at block 814, a current location of the client device is identified based on a center point of the identified intersection rectangle.

Again a motion model may be used to increase the accuracy of the prediction based on a previous identified location. Similarly to the voting map example described above, an isotropic model (dilating the previous rectangle by the sigma) or anisotropic model (shifting the previous rectangle in the direction and distance specified by the pedometer or other motion or direction sensing device) may be used to convert the previous timestamp prediction $R(t-1)$ to $Rpred(t-1)$. A current rectangle, $R(t)$ may be obtained by identifying the intersection of $Rlocal(t)$ and $Rpred(t-1)$. Here if the intersection area is zero, the older estimate may be discarded or other discounting strategies, such as a Kalman filter or particle filter methods, may also be used. Next, the current prediction may be estimated as the center of $R(t)$ or other more sophisticated methods, such as the weighted centroid, may be used.

Figure 9B:
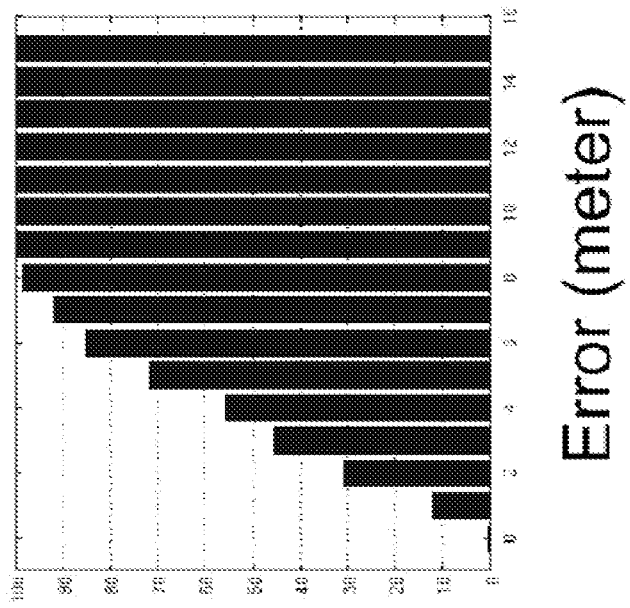
FIGS. 9A and 9B are error graphs in accordance with an exemplary embodiment.
Figure 9A:
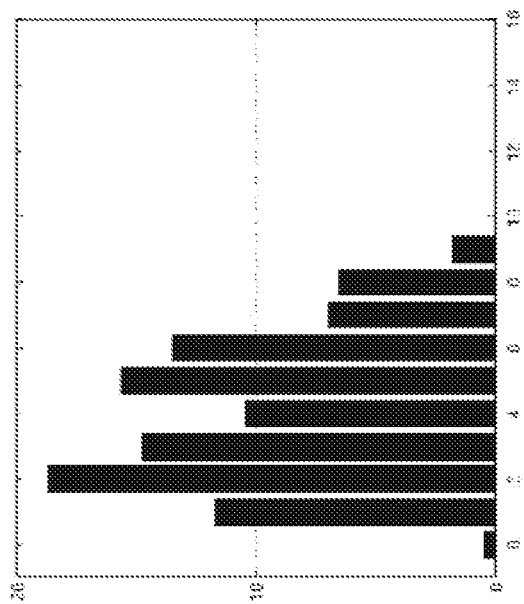

FIGS. 9A and 9B are exemplary error graphs generated based on using the rectangular model to identify a current location of a mobile device using the isotropic model described above. FIG. 9A depicts the amount of error (in meters) identified at a plurality of locations, while FIG. 9B is a depiction of the cumulative error. As can be seen from the figures, the graphs demonstrate that 30% of the time, the voting model was accurate to less than 2 meters, 55% to less than 3 meters, and 85% to less than 6 meters.

It will be understood that other shapes, polygons, or even circles may be used instead of rectangles. However, these shapes may require additional computations as computing an intersection polygon and its center may be more complicated.

Unless stated otherwise, the foregoing alternative embodiments are not mutually exclusive, but may be implemented in various combinations to achieve unique advantages. For example, one may use the voting model generally but switch to the rectangular model where network bandwidth is a concern but CPU resources are not. In addition, the rectangle data may be used in a boosting framework to increase the overall accuracy of both models. The rectangles may be used as weak classifiers within a framework, such as the Adaboost or Cascades frameworks, to increase the accuracy of the predictions by weighting the rectangles.

If the client device has access to a collection of voting or rectangular maps stored locally, the client device may perform the aforementioned calculations. Alternatively, the client device may transmit the observations, for example, via cellular or other wireless networks, to the server to perform the calculations and transmit a location to the client device.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting claimed subject matter to the specific examples; rather, the examples are intended to illustrate only one of many possible embodiments. Further, the same reference numbers in different drawings may identify the same or similar elements.

The invention claimed is:

1. A method comprising:
receiving a set of voting maps, each voting map of the set of voting maps including a wireless network access point identifier and signal strength data;
scanning for wireless network signals to identify scan results including one or more wireless network access point identifiers and associated signal strengths;
associating the scan results with a timestamp;
quantizing, by a processor, the signal strengths of the identified one or more wireless network access point identifiers to obtain quantized identified signal strengths;
selecting one or more voting maps of the set of received voting maps based upon the identified one or more wireless network access point identifiers;
combining the selected one or more voting maps into a cumulative voting map;
normalizing the cumulative voting map to obtain a probability distribution over location;
propagating the probability distribution from a previous timestamp using a motion model; and
identifying, by the processor, the current location of a client device based on the propagated distribution.

2. The method of claim 1, wherein identifying the current location of the client device is based on a previous location of the client device and the motion model is an isotropic diffusion model.

3. The method of claim 1, wherein identifying the current location of the client device is based on a previous location of the client device and the motion model is an anisotropic diffusion model based on directional motion information.

4. The method of claim 3, further comprising receiving input from a directional device, wherein the anisotropic diffusion model is based on the received input.

5. The method of claim 1, wherein the set of voting maps is associated with a floor of a building.

6. The method of claim 1, wherein the motion model is based on sensor input received from an accelerometer.

7. The method of claim 1, wherein the motion model is based on sensor input received from a gyroscope.

8. The method of claim 1, further comprising combining the propagated distribution with a current probability distribution to obtain a combined probability distribution, and wherein the current location of the client device is identified based on the combined probability distribution.

9. The method of claim 1, wherein the wireless network access point identifiers is a MAC address.

10. A device for determining a current location of the device, the device comprising:
memory;
a processor to:
collect one or more wireless network access point identifiers and signal strengths associated with the one or more wireless network access point identifiers for an indoor geographic area;
quantize the collected signal strengths into a plurality of quantized collected signal strengths for each associated wireless network access point identifiers;

generate a voting map for each wireless network access point identifier and quantized collected signal strength;
store each voting map in the memory;
scan for wireless network signals to identify scan results including one or more wireless network access point identifiers and associated signal strengths;
associate the scan results with a timestamp;
quantize the signal strengths of the identified one or more wireless network access point identifiers to obtain quantized identified signal strengths;
select one or more voting maps based upon the identified one or more wireless network access point identifiers;
combine the selected one or more voting maps into a cumulative voting map;
normalize the cumulative voting map to obtain a probability distribution over location;
propagate the probability distribution from a previous timestamp using a motion model; and
identify the current location of the device based on the propagated distribution.

11. A device for determining a current location of the device, the device comprising:
memory storing a set of voting maps, each voting map of the set of voting maps including a wireless network access point identifier and signal strength data; and
a processor to:
scan for wireless network signals to identify scan results including one or more wireless network access point identifiers and associated signal strengths;
associate the scan results with a timestamp;
quantize the signal strengths of the identified one or more wireless network access point identifiers to obtain quantized identified signal strengths;
select one or more voting maps based upon the identified one or more wireless network access point identifiers;
combine the selected one or more voting maps into a cumulative voting map;
normalize the cumulative voting map to obtain a probability distribution over location;
propagate the probability distribution from a previous timestamp using a motion model; and
identify the current location of the device based on the propagated distribution.

12. The device of claim 11, wherein the processor identifies the current location of the device based on a previous location of the device and the motion model is an isotropic diffusion model.

13. The device of claim 11, wherein the processor identifies the current location of the device based on a previous location of the device and the motion model is an anisotropic diffusion model based on directional motion information.

14. The device of claim 13, wherein the processor receives input from a directional device and the anisotropic diffusion model is based on the received input.

15. The device of claim 11, wherein the set of voting maps is associated with a floor of a building.

16. The device of claim 11, wherein the motion model is based on sensor input received from an accelerometer.

17. The device of claim 11, wherein the processor combines the propagated distribution with a current probability distribution to obtain a combined probability distribution, and the processor identifies the current location of the device based on the combined probability distribution.

18. The device of claim 11, wherein the wireless network access point identifiers is a MAC address.

\* \* \* \* \*